United States Patent [19]

Wilkinson et al.

[11] Patent Number: 5,261,069

[45] Date of Patent: Nov. 9, 1993

[54] METHOD OF MAINTAINING CONSISTENCY OF CACHED DATA IN A DATABASE SYSTEM

[75] Inventors: W. Kevin Wilkinson, Sunnyvale; Marie-Anne Neimat, Atherton, both of Calif.

[73] Assignee: Hewlett-Packard Company, Palo Alto, Calif.

[21] Appl. No.: 566,732

[22] Filed: Aug. 13, 1990

[51] Int. Cl.⁵ .................................................. G06F 1/00
[52] U.S. Cl. .................................. 395/425; 395/600;
364/DIG. 2; 364/974; 364/969; 364/969.2;
364/964; 364/964.2
[58] Field of Search ... 364/200 MS File, 900 MS File;
395/425, 400, 600

[56] References Cited

U.S. PATENT DOCUMENTS

| | | | |
|---|---|---|---|
| 4,755,930 | 7/1988 | Wilson, Jr. et al. | 364/200 |
| 4,775,955 | 10/1988 | Liu | 364/900 |
| 4,897,782 | 1/1990 | Bennett et al. | 395/600 |
| 4,965,719 | 10/1990 | Shoens et al. | 395/650 |
| 5,029,169 | 7/1991 | Smyk | 371/19 |
| 5,055,999 | 10/1991 | Frank et al. | 364/200 |
| 5,077,658 | 12/1991 | Bendert et al. | 395/600 |
| 5,091,846 | 2/1992 | Sachs et al. | 395/250 |
| 5,113,514 | 5/1992 | Albonesi et al. | 395/425 |
| 5,140,685 | 8/1992 | Sipple et al. | 395/425 |
| 5,161,227 | 11/1992 | Dias et al. | 395/725 |

OTHER PUBLICATIONS

"VAXclusters: A Closely-Coupled Distributed System", by Kronenberg, N. P., Levy, H. M., Strecker, W. D.; ACM Transactions on Computer Systems, vol. 4, No. 2, May 1986, pp. 130-146.

"Integrated Concurrency-Coherency Controls for Multisystem Data Sharing", by Dias, D. M., Balakrishna, R. I., Robinson, J. T. and Yu, P. S.; IEEE Transactions on Software Eng., vol. 15, No. 4, Apr. 1989, pp. 437-448.

Primary Examiner—Rebecca L. Rudolph

[57] ABSTRACT

A method of maintaining the consistency of cached data in a client-server database system. Three new locks—a cache lock, a pending lock and an out-of-date lock—are added to a two-lock concurrency control system. A new long-running envelope transaction holds a cache lock on each object cached by a given client. A working transaction of the client works only with the cached object until commit time. If a second client's working transaction acquires an "X" lock on the object the cache lock is changed to a pending lock; if the transaction thereafter commits the pending lock is changed to an out-of-date lock. If the first client's working transaction thereafter attempts to commit, it waits for a pending lock to change; it aborts if it encounters an out-of-date lock; and otherwise it commits.

17 Claims, 8 Drawing Sheets

METHOD OF MAINTAINING CONSISTENCY OF CACHED DATA IN A DATABASE SYSTEM

BACKGROUND OF THE INVENTION

The present invention relates generally to a method of controlling the operation of an electronic computer and more particularly to a method of maintaining consistency of cached data in a computer database system of the kind in which objects are copied from a database into a cache for ready access by a client application.

Many modern computer systems include databases that must be accessible to a number of users more or less simultaneously. Typically, not all of these users are at the same location. For example, an airline reservation system includes a central computer that contains flight schedules, passenger reservations, seat assignments, fares and the like. This information must be available on demand to many hundreds of reservation clerks and travel agents at numerous locations throughout the nation.

Another example is a bank computer system. The computer contains account balances and other information respecting the bank's customers. Tellers in various branches of the bank must have access to the information in the computer to process deposits, withdrawals and other transactions. In addition, more and more bank customers are conducting their own banking transactions themselves by using automatic teller machines ("ATMs") that are located not only in banks but in airports, shopping centers, and other public places, and by using personal computers located in their homes.

Still another example is a local area network ("LAN") that interconnects a plurality of workers (e.g., attorneys, engineers, secretaries) in an office or other working environment. A computer contains word processor files (such as standard documents, legal briefs, research reports, correspondence and the like), design projects, electronic messages, and other data access to which may be required at any time by one or more of the workers.

It will be apparent that when several users are simultaneously working with a database two or more of them may attempt to alter the same item of data at the same time. For example, a teller may attempt to process a customer's withdrawal or deposit in a branch office of a bank at the same time as an account clerk in the main office is debiting checks and service charges to the same customer's account. A conflict between these transactions can result in erroneous data being entered into the database. The prevention of such conflicts is known as concurrency control.

More specifically, in the context of a database system the term "transaction" is defined as "a logical unit of work." Date, C. J., *An Introduction to Database Systems*, 4th Ed., Vol. 1, pub. Addison-Wesley, 1986, page 413. Typically, a logical unit of work is a sequence of steps that culminates with a "commit request", that is, an attempt permanently to alter an item of data in the database. "Transactions" are sometimes referred to in the literature by such terms as "client transactions" and "user transactions"; they will be referred to herein as "working transactions" to distinguish them from the client applications which generate them and from human users of the database system.

Many database management systems use "locks" for concurrency control. In a widely used two-phase lock approach to concurrency control, the server grants a working transaction a share ("S") lock on an "object" in the database when the transaction wishes to prevent the object from being changed for a limited period of time. In physical terms, an S lock comprises a control signal, an entry in a computer register, or the like that prevents the computer from altering the locked object. More than one transaction can have an S lock on an object at the same time.

The server grants a working transaction an exclusive ("X") lock on an object when the transaction is about to alter the object. If a given transaction has an X lock on an object, no other transaction can acquire either an S or an X lock on the object. This prevents the other transaction from attempting to read or alter the item during the time the given transaction is engaged in altering the item.

To prevent any loss of generality, the term "object" as used herein should be understood as referring either to a data object (a set of data items and relations among those data items) in the context of an object-oriented database or to any item of data in the context of some other kind of database.

When a working transaction requests a lock on an object, the request is either granted, delayed or denied by the server. If the request is granted, the transaction is said to have "acquired" the lock. If the request is delayed, the transaction waits for further word from the server, and if the request is denied the transaction usually aborts.

Under some circumstances, the granting of a requested lock must occur immediately because of the status of some condition of the system at the time the request is made. For convenience, this is referred to herein as "getting" a lock as opposed to "acquiring" a lock which implies that the server grants the lock only after determining that the lock can properly be granted.

For more information on database locking system generally, see Date, *An Introduction to Database Systems* (cited above), Ch. 18 and the references cited therein.

A common paradigm for providing shared access to computer database such as the examples mentioned above is a client-server system. A client-server system includes a centrally located main computer (the "server") in which a database is stored and a plurality of satellite computers (the "clients") which are linked to the main computer by some form of electronic communication system and which use portions of the database as needed.

A server usually comprises a computer, a database, memory for storing the database, and database management software. The memory typically consists of some combination of random-access memory ("RAM") and magnetic media such as tapes and disks, but some computer systems may use optical media and other storage devices. Depending on the requirements of the system, the server might be anything from a desktop personal computer with a hard disk and commercially available database software to a large mainframe computer with multiple tape drives and specially designed database software.

A client is typically a personal computer such as a Hewlett-Packard Vectra, a workstation such as a Hewlett-Packard 9000 series, or some other kind of computer terminal such as a bank ATM machine. The client has its own memory which is usually smaller than the server memory. Most clients are remote from the server, but in some systems a client may be collocated with the server and may even use a portion of the same physical memory device as used by the server instead of having its own.

Each client has one or more "applications" such as word processors, spread sheets, electronic mail, computer-aided design ("CAD") programs, and database interface software that communicate with the server to obtain information from the database, to update information in the database and to add new information to the database. Some of these applications may be under the control of a human operator and others may run automatically or under the control of another application.

An electronic communication system which may comprise, for example, commercial telephone lines and dedicated circuits carries messages between the clients and the server. Sending large numbers of messages back and forth is costly, not only in terms of the expense of operating the communication system but also in terms of time and computer resources. Therefore it is desirable to minimize the number of messages that flow between the clients and the server.

One way to reduce the number of messages is to copy a portion of the data from the server's memory into a "cache" in the client's memory. This cached data is then used by the client as needed without having to send a message to the server each time an item of data must be referred to.

A cache and the memory in which it is stored are typically physically located in a client which as noted above is remote from the server. However, in some installations one or more caches may be stored in a different portion of the same physical memory device as is used by the server to store the database. Thus, although a client cache is always distinct from the main database and is usually physically located in a separate memory structure that may be thousands of miles away, the two may be physically adjacent in a single memory device.

There must be a protocol between the client and the server to ensure that the data in the cache remains consistent with the data in the main server database. In this sense, the client cache may be viewed as active data since updates to the server database should trigger a cache refresh operation so that the updated information is also put into the cache.

An "active" database allows a client application to be informed of changes made by other applications to an "active" portion of the data in the main server database. In the context of a client-server system, this has meant that all updates to the server database must be monitored by the database management system to determine whether the updates affect any active data associated with any other application. When updates affect any active data, the affected clients must be informed that a change has occurred. Thus, every transaction incurs heavy overhead to support a detection and notification service that often is not needed to benefit the transaction.

It will be apparent that as the number of clients increases, the overhead required to keep the various client caches current also increases. For example, in a large system such as an airline reservation system or a bank computer system there may be hundreds of clients caching data at locations many hundreds of miles from the server. Even in a LAN system in a single office building there may be a hundred or more clients caching data in personal computers and workstations. The overhead required to keep all these caches current can substantially degrade performance of the system.

There have been various attempts to reduce this cache consistency overhead and thereby improve system performance. In one such approach the primary motivation for maintaining multiple copies of data was to improve system reliability and availability; in that environment, all copies of the data are assumed persistent and extra overhead is incurred to keep the multiple copies up to date. Bernstein, P. A., and N. Goodman, "An Algorithm for Concurrency Control and Recovery in Replicated Distributed Databases," *ACM Transactions on Database Systems*. Vol. 9, No. 4, December 1984; Gifford, D. K., "Weighted Voting for Replicated Data," *Proceedings of the 7th Symposium on Operating Systems Principles*, December 1979.

Another approach emphasizes an efficient mechanism for refreshing a snapshot of data (a snapshot may be considered a kind of cache) after an update to the database by means of a refresh algorithm for views over a single base table. Lindsay, B., L. Haas, C. Mohan, H. Pirahesh and P. Wilms, "A Snapshot Differential Refresh Algorithm," *Proceedings of the 1986 SIGMOD Conference*, Washington D.C., June 1986. To detect view updates, a base table must be augmented with a timestamp and link field for each tuple. An algorithm for arbitrary select-project-join views is described in Blakeley, J. A., P. -A. Larson and F. W. Tompa, "Efficiently Updating Materialized Views," *Proceedings of the 1986 SIGMOD Conference*, Washington D.C., June 1986. Each update transaction has a side effect of building additional sets of tuples to add or remove from each affected view.

A system that supports read-only caching for workstations accessing a central database is described in Gladney, H. M., "Data Replicas in Distributed Information Services," *ACM Transactions on Database Systems*, Vol. 14, No. 1, March 1989. This system requires changes to the database management system to timestamp base data.

Optimistic concurrency control is a system that does not use locks. Instead, transactions proceed unhindered until commit time, at which time conflicts must be resolved. Kung, H. T., and J. T. Robinson, "On Optimistic Methods for Concurrency Control,", *ACM Transactions on Database Systems*, Vol. 6, No. 2, June 1981. This system is generally considered to be more suitable for non-distributed database systems than for client-server systems.

Timestamping methods that do not use locks have also been proposed. In these methods, each update of a data object is timestamped. A commit request includes both a read/write set and the time at which its transaction started. The server then checks this time against the time stamps of all other working sets for any conflicts. Bernstein, P. A., and N. Goodman, "Timestamp-Based Algorithms for Concurrency Control in Distributed Database Systems," *Proceedings of the 6th International Conference on Very Large Data Bases*, October 1980. This system was developed in an effort to avoid the overhead of a locking system.

Other approaches involve cooperating transactions and active databases with real time requirements. Fernandez, M. F., and S. B. Zdonik, "Transaction Groups: A Model for Controlling Cooperative Transactions," *Proceedings of the Workshop on Persistent Object Systems: Their Design, Implementation and Use*, Newcastle, Australia, January 1989; Risch, T., "Monitoring Database Objects", *Proceedings of the 15th International Conference on Very Large Data Bases*, Amsterdam, 1989, also described in copending U.S. patent application Ser. No. 07/286,556, filed Dec. 19, 1988 and assigned to the same assignee as the present application; and Rosenthal, A., S. Chakravarthy, B. Blaustein and J. Blakely, "Situation Monitoring for Active Databases," *Proceedings of the 15th International Conference on Very Large Data Bases*, Amsterdam, 1989. A system of nested transactions has also been proposed. Moss, J. E. B., Nested Transactions: *An Approach to Reliable Distributed Computing*, PhD thesis, Massachusetts Institute of Technology, April 1981. However, none of these approaches has adequately solved the problem of maintaining the consistency of cached data.

It will be apparent from the foregoing that there remains a need for an efficient way to maintain the consistency of cached data in a client-server database system.

SUMMARY OF THE INVENTION

The present invention provides a method of maintaining the consistency of cached data by means of a set of three new locks which are integrated with an existing lock manager of a database management system and a new long-term client transaction which holds the new locks. This novel method of locking data provides a very low overhead way of ensuring the consistency of the cached data at all critical times.

Briefly and in general terms, the present invention provides a method of maintaining the consistency of cached data in a computerized database system of the kind having a database of objects in a server memory and a cache of objects in a client memory. Each object in the cache corresponds with an object in the database. Typically, each of a plurality of clients maintains its own cache, copying objects from the database into its cache as needed.

The three novel locks provided by the invention include a cache lock, a pending lock and an out-of-date lock. Each of these locks can co-exist with each other and with an S lock. In addition, each of them can co-exist with an X lock; however, an X lock has an immediate effect on a cache lock as will be explained in more detail hereafter.

The novel transaction provided by the invention, the "envelope" transaction, is preferably used to hold cache, pending and out-of-date locks on database objects that correspond with a client's cached objects. The client starts its envelope transaction not later than the time the first object is copied into its cache, and the envelope transaction exists as long as there are any locks for it to hold. Although the envelope transaction could in theory hold S and X locks, in practice it does not have occasion to hold an X lock. It holds an S lock on an object only during the time the object is being copied into the cache.

In the method of the invention, when a client copies an object into its cache the server grants the client's envelope transaction a cache lock on the object. If an object on which a client has a cache lock is altered, the server changes the cache lock to an out-of-date lock. Changing a cache lock to an out-of-date lock preferably involves two steps. First, the cache lock changes to a pending lock if some other client's working transaction acquires an X lock on the object. Second, the pending lock changes to an out-of-data lock if the transaction commits and back to a cache lock if the transaction aborts.

The server actually retains the various locks on objects in the database. The client's envelope transaction need not be notified of changes in any cache locks it is holding on objects in the database unless a working transaction of that client attempts to commit, at which time the transaction simply aborts if any of the objects in its read/write set has an out-of-date lock.

A client's working transaction accesses the objects in its cache until it is ready to commit. At commit time, it designates any cached objects that it has accessed as read or write objects depending on whether the corresponding objects in the database are to be read or are to be altered in some way. The working transaction then acquires an X lock on each database object that has a cache lock and that corresponds with a write object, and an S lock on each database object that has a cache lock and that corresponds with a read object. If any of the read or write objects has an out-of-date lock, the transaction aborts.

Preferably, if the server has changed a cache lock on a write object into a pending lock, the working transaction waits for the pending lock to change to a cache lock or to an out-of-data lock, at which time it acquires an X lock or aborts, respectively.

Efficiency of the system can be further improved by appending to a message from the server to the client a report on which cache locks held by that client have been changed to out-of-data locks. This allows the client to request refresh of any out-of-date objects in the cache that are needed by a working transaction before the transaction attempts to commit.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 7 is drawn on two sheets, labelled FIG. 7A and FIG. 7B, respectively.

DESCRIPTION OF THE PREFERRED EMBODIMENT

As shown in the drawings for purposes of illustration, the invention provides a method of maintaining consistency of cached data in a server-client database system. Various methods of maintaining consistency of cached data have been proposed, but these methods all impose unacceptable overhead or and have not been adequate.

The method of the invention provides three new locks (a cache lock, a pending lock and an out-of-date lock) and a new transaction (an envelope transaction). The envelope transaction holds a cache lock on each database object that is loaded into a cache. The cache lock may be changed to a pending lock and then to an out-of-date lock if the locked object is altered. If a working transaction attempts to commit, a pending lock on any affected object causes the transaction to wait and an out-of-date lock causes the transaction to abort. This method, which is easily implemented in a two-lock concurrency control system, ensures the consistency of cached data with a minimum overhead and without any need for keeping timestamps or passing messages every time an object in the database is altered.

Figure 1:
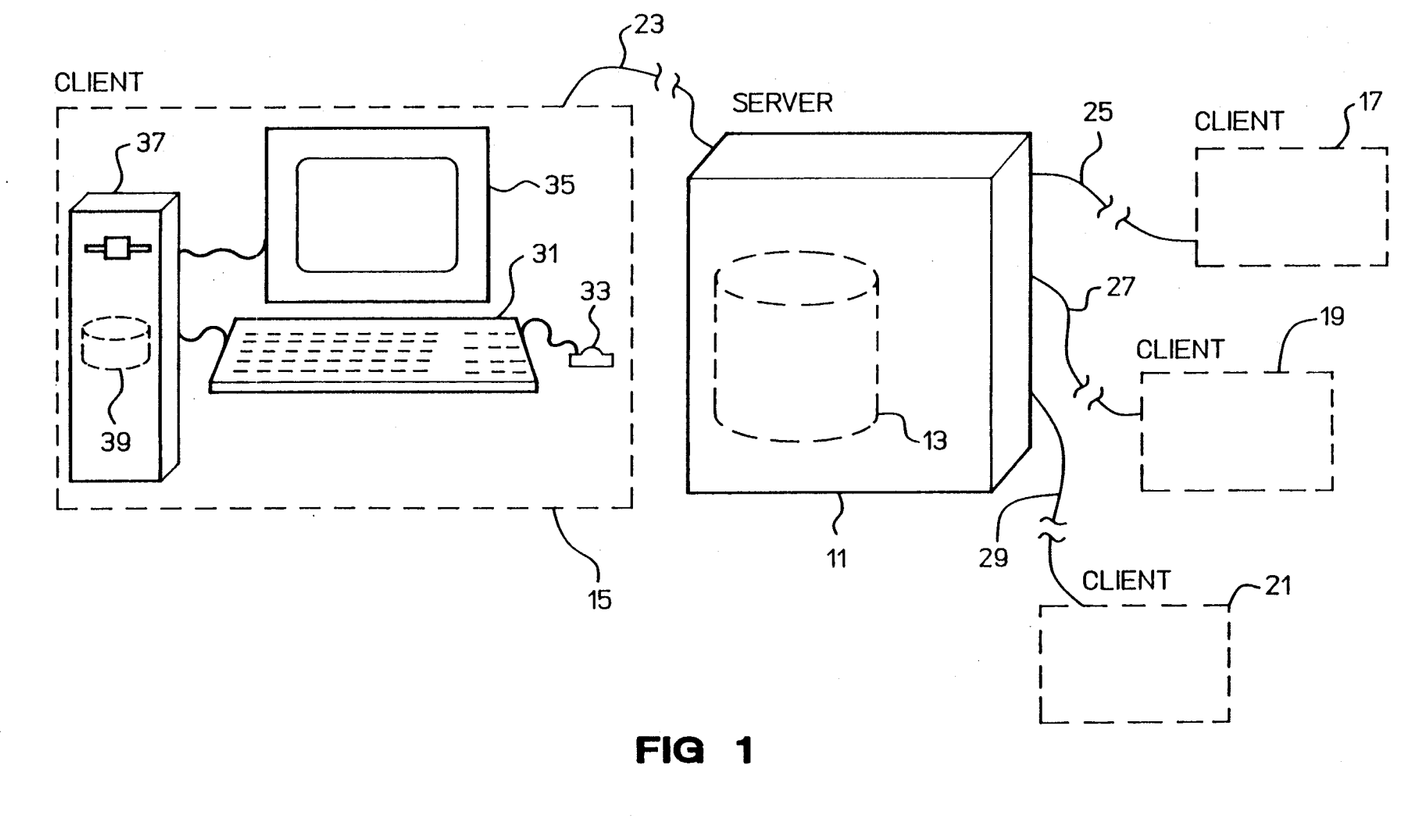
FIG. 1 is a schematic representation of a database server system having a server and a plurality of clients.

A typical client-server computer database system in which the invention is advantageously employed is shown in FIG. 1. A centrally located server 11 includes a database stored in a server memory such as a magnetic storage unit 13. Other parts of the server 11, such as a central processor, input and output devices, software, and the like are not shown but are known to those skilled in the art.

A plurality of remotely-located clients 15, 17 and 19 and 21 are connected to the computer by communication links 23, 25, 27 and 29, respectively. These communication links may comprise commercial telephone circuits, dedicated circuits, a local area network or the like.

The client 15 comprises such items as, for example, a keyboard 31, a mouse 33, display screen 35 and a processor unit 37. The processor unit includes a client memory such as a magnetic storage unit 39. The functioning of these components is known to those skilled in the art and will not be discussed further herein. The clients 17, 19 and 21 may have similar or different configurations than the client 15. Other clients (not shown) may be included as desired. In addition, one or more clients may be included directly in the server as well as at remote locations.

In the embodiment of the invention to be described, it is assumed that the storage unit 13 in the server 11 contains all the database objects and that one or more of the clients keeps its cache locally in storage such as the storage unit 39. However, it will be apparent to those skilled in the art that the invention is not limited to a database system that is configured in this way. For example, the database objects may be distributed among more than one location instead of all being stored in the same physical location. Also, as mentioned previously the term "object" is intended to refer either to a data object or to some other kind of data item depending on the kind of database system in which the invention is implemented.

A method of maintaining consistency of cached data according to the invention, as depicted in flow chart form in FIGS. 2 through 7, includes the steps of acquiring a cache lock on a database object that has a corresponding object in the cache (blocks 41, 43 and 45), changing the cache lock to an out-of-date lock if the database object is altered (block 47), and aborting a working transaction that has accessed a cached object if the corresponding database object has an out-of-date lock at commit time (block 49).

The step of changing the cache lock to an out-of-date lock comprises changing the cache lock to a pending lock if a second working transaction acquires an exclusive lock on the database object (block 51) and changing the pending lock to an out-of-date lock (block 47) if the second transaction commits and back to a cache lock (block 53) if the transaction aborts.

When a working transaction of the first client application is ready to commit, any cached objects that are accessed by that working transaction are designated as read or write objects (block 55). An exclusive lock is acquired on each database object that has a cache lock and that corresponds with a write object (block 57) and a share lock is acquired on each database object that has a cache lock and that corresponds with a read object (block 59). The transaction is committed (block 61) unless a database object that corresponds with any read or write object has an out-of-date lock (blocks 63 and 65). The method preferably includes waiting for any pending lock on a database object that corresponds with a write object, to change to a cache lock or to an out-of-date lock (block 67).

The invention provides an envelope transaction to hold the cache, pending and out-of-date locks on objects in a client's cache. The envelope transaction commences before any objects are placed in the cache (block 69), acquires a cache lock on a database object that has been copied into the cache (blocks 41, 43 and 45) for use by the client application, and continues until after a working transaction of the client application has committed (block 71). The envelope transaction continues to exist so long as there are any cache, pending and out-of-date locks to be held; preferably it continues to exist until the client application stops.

Preferably, if the server has occasion to send the client a message, it includes in the message a report indicating which cache locks on database objects that have been copied into the client's cache have been changed to out-of-date locks (block 73). This permits the client to request refresh of its cache, thereby reducing the chances of subsequent working transactions aborting due to out-of-date locks.

Figure 2:
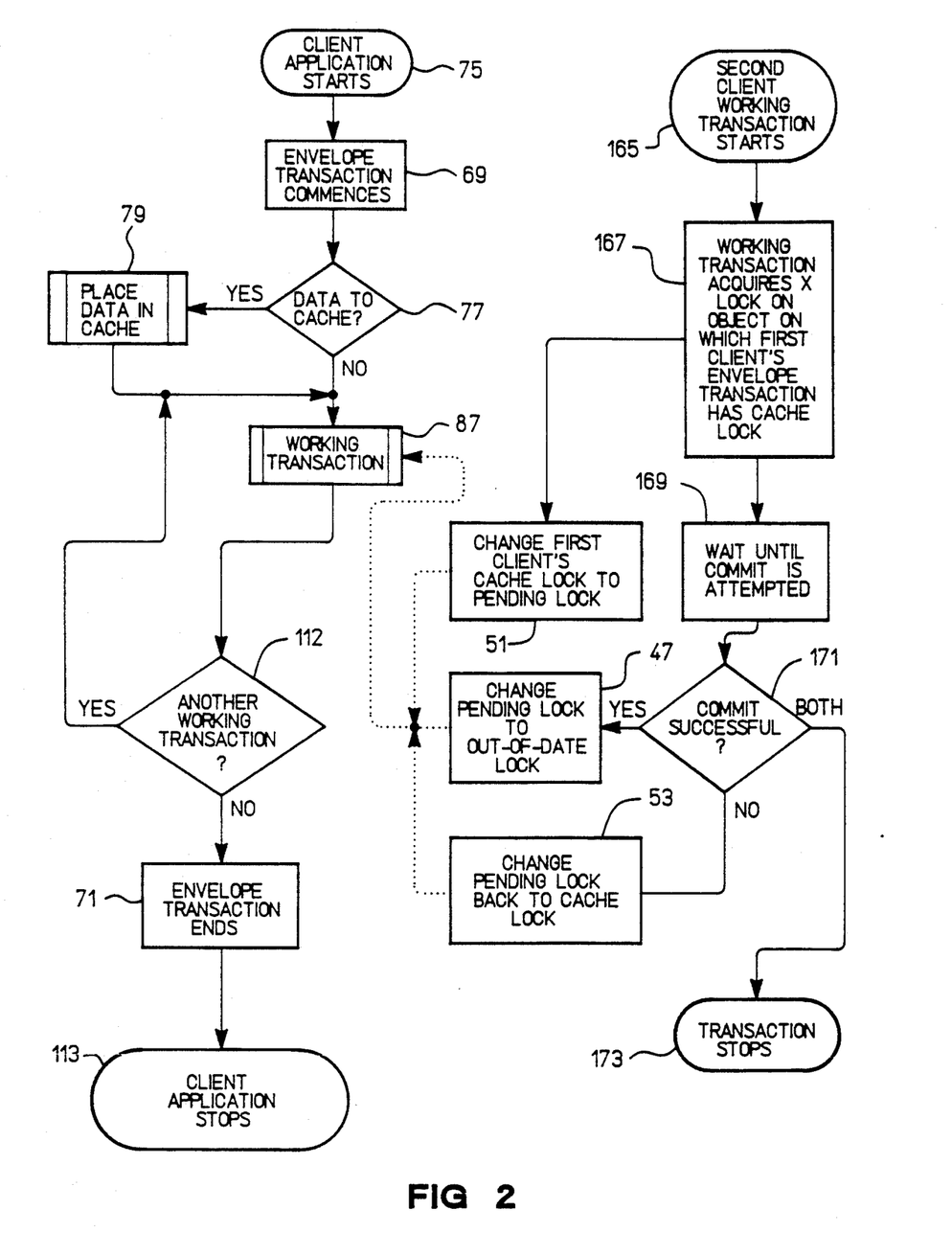
FIG. 2 is a flow chart generally depicting the transactions of a client application that runs on a client of the kind shown in FIG. 1 and also including selected steps of a working transaction of a second client.

As best shown in FIG. 2, the operation of a typical client application starts (block 75) and before any data is cached the client's envelope transaction commences (block 69) although, as already noted, the envelope transaction need not commence until data is placed in the cache. When it is desired to place data into the cache (blocks 77), the server is notified and copies the data into the cache (block 79).

Figure 3:
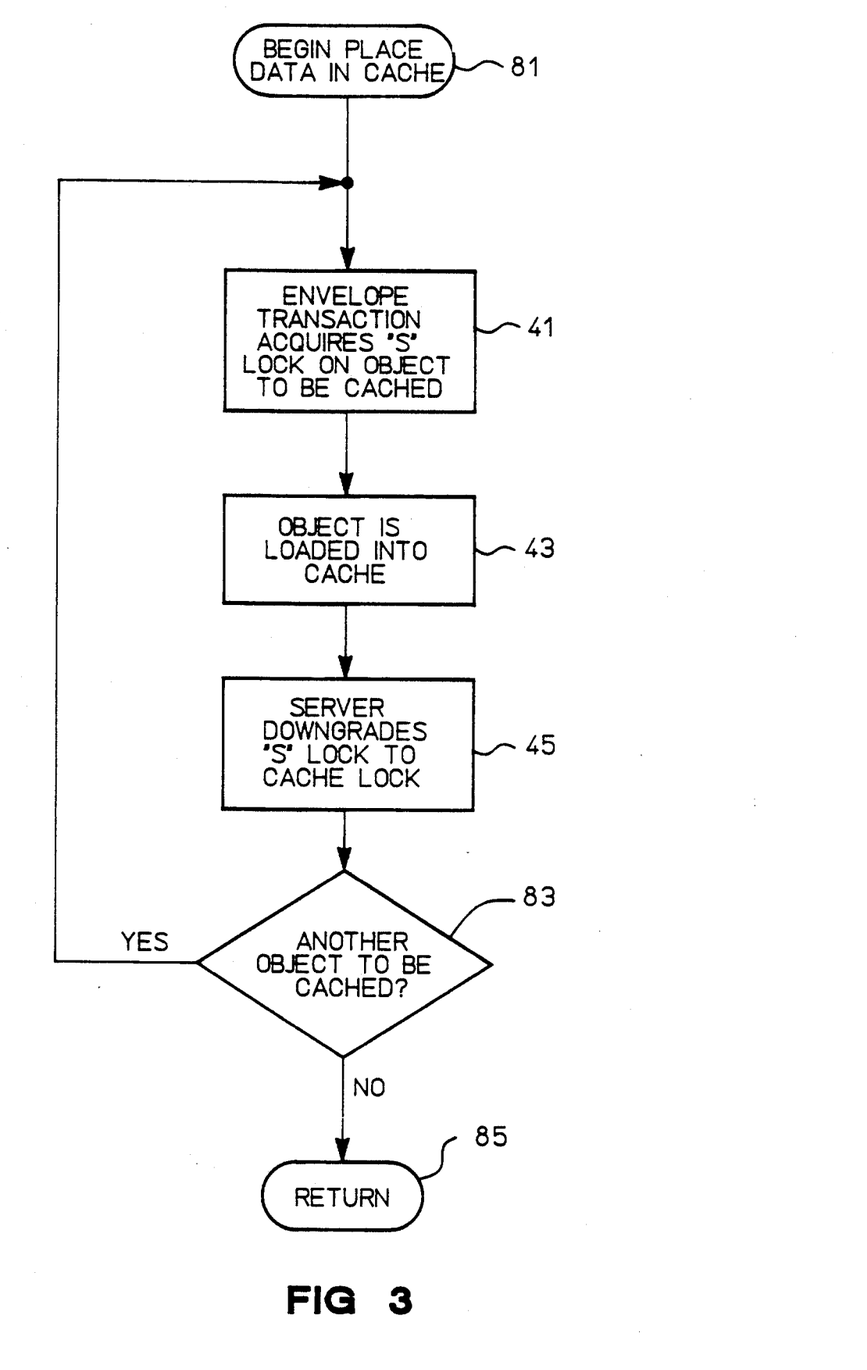
FIG. 3 is a flow chart depicting a typical sequence of steps corresponding with the "place data in cache" box of FIG. 2.

More particularly, as best shown in FIG. 3, when data begins to be put into the cache (block 81), the envelope transaction acquires an "S" lock on an object to be cached to prevent the object from changing during the caching operation (block 41). The object is loaded into the cache (block 43) and then the server downgrades the "S" lock to a cache lock (block 45). If there are more objects to be cached these steps are repeated (block 83), otherwise the caching procedure ends (block 85).

Figure 4:
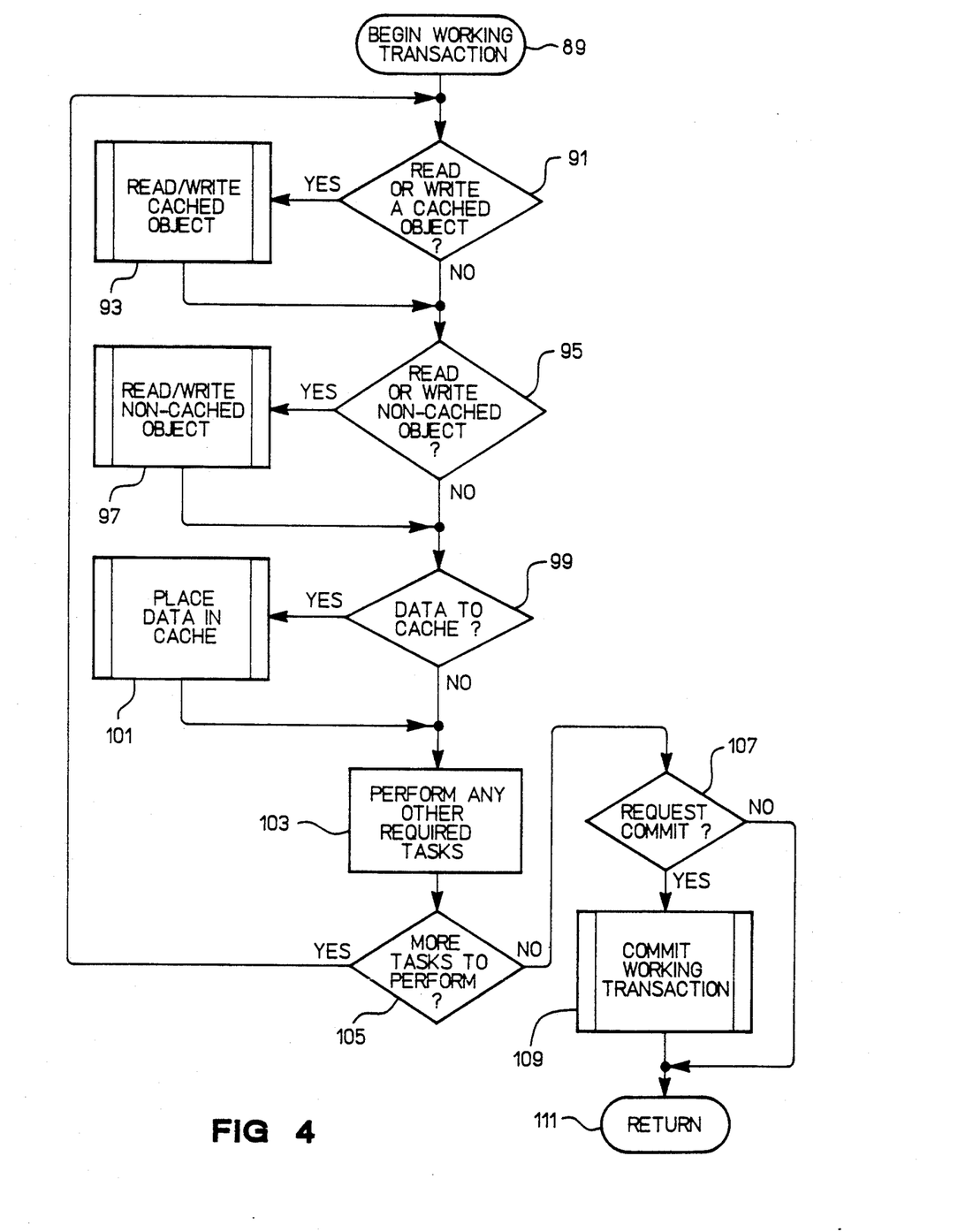
FIG. 4 is a flow chart depicting a typical working transaction corresponding with the "working transaction" box of FIG. 2.

If the client application initiates a working transaction (block 87) various tasks are accomplished as best shown in FIG. 4. The working transaction begins (block 89) and reads or writes a cached object (blocks 91 and 93) or a non-cached object (blocks 95 and 97), places more data in the cache (block 99) according to the procedure illustrated in FIG. 3 (block 101), or performs any other required task (block 103) as required.

When there are no more such tasks to perform (block 105), if commit is desired (block 107) a commit sequence is performed (block 109) before the working transaction ends (block 111). If commit is not desired, the transaction would probably abort. If there are no more working transactions (block 112) the envelope transaction ends (block 71) and the application stops (block 113).

Figure 5:
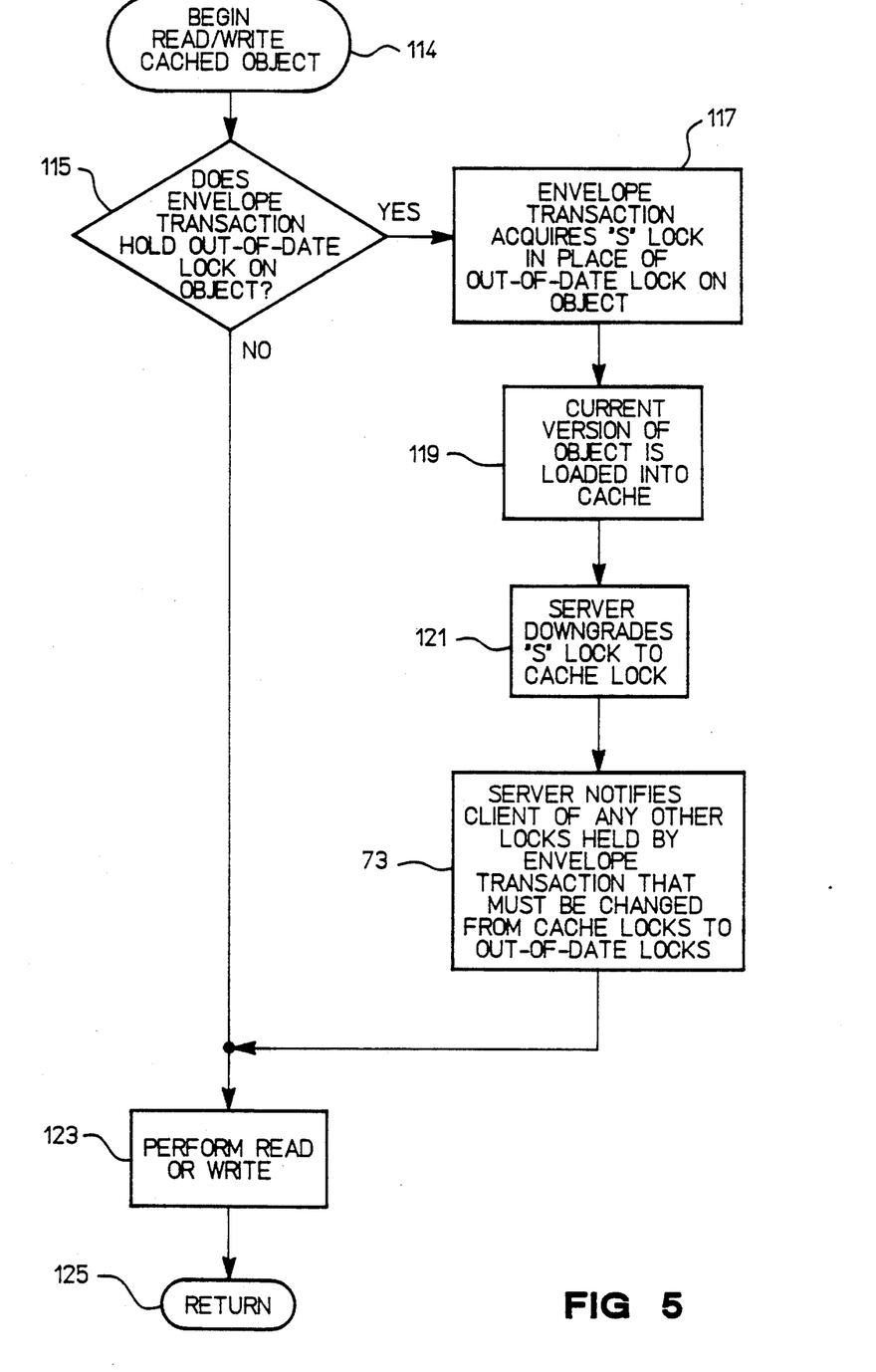
FIG. 5 is a flow chart depicting a typical sequence of steps corresponding with the "read/write cached object" box of FIG. 4.

The sequence of reading or writing a cached object (block 93) is shown in more detail in FIG. 5. The sequence begins (block 114) with updating the cached object if the envelope transaction has an out-of-date lock on the object (block 115). Note that a cache lock is changed to an out-of-date lock by the server in response to alteration of an object in the database by commitment of another client's working transaction but that the client's envelope transaction is aware of such an event only if a message has been sent from the server to the client conveying this information. A message conveying this information could be sent any time, but preferably such information is not sent unless a message conveying some other information must be sent anyway, in which event the information respecting any cache locks that have changed to out-of-date locks is appended to the message.

If the envelope transaction knows that the cache lock on the object which is to be read or written has been changed to an out-of-date lock, then a refresh sequence is initiated. The envelope transaction acquires an "S" lock from the server (block 117), the current version of the object is loaded into the cache (block 119), the "S" lock is downgraded to a cache lock (block 121), and since a new message downgrading the "S" lock must be sent anyway the server also notifies the envelope transaction if any of its other cache locks have been changed to out-of-date locks in the meantime (block 73). Any affected object in the cache could be refreshed at that time, but preferably refreshing is not done unless a working transaction tries to access such an object.

After these steps have been performed as needed, the read or write is performed (block 123) and the procedure ends (block 125).

Figure 6:
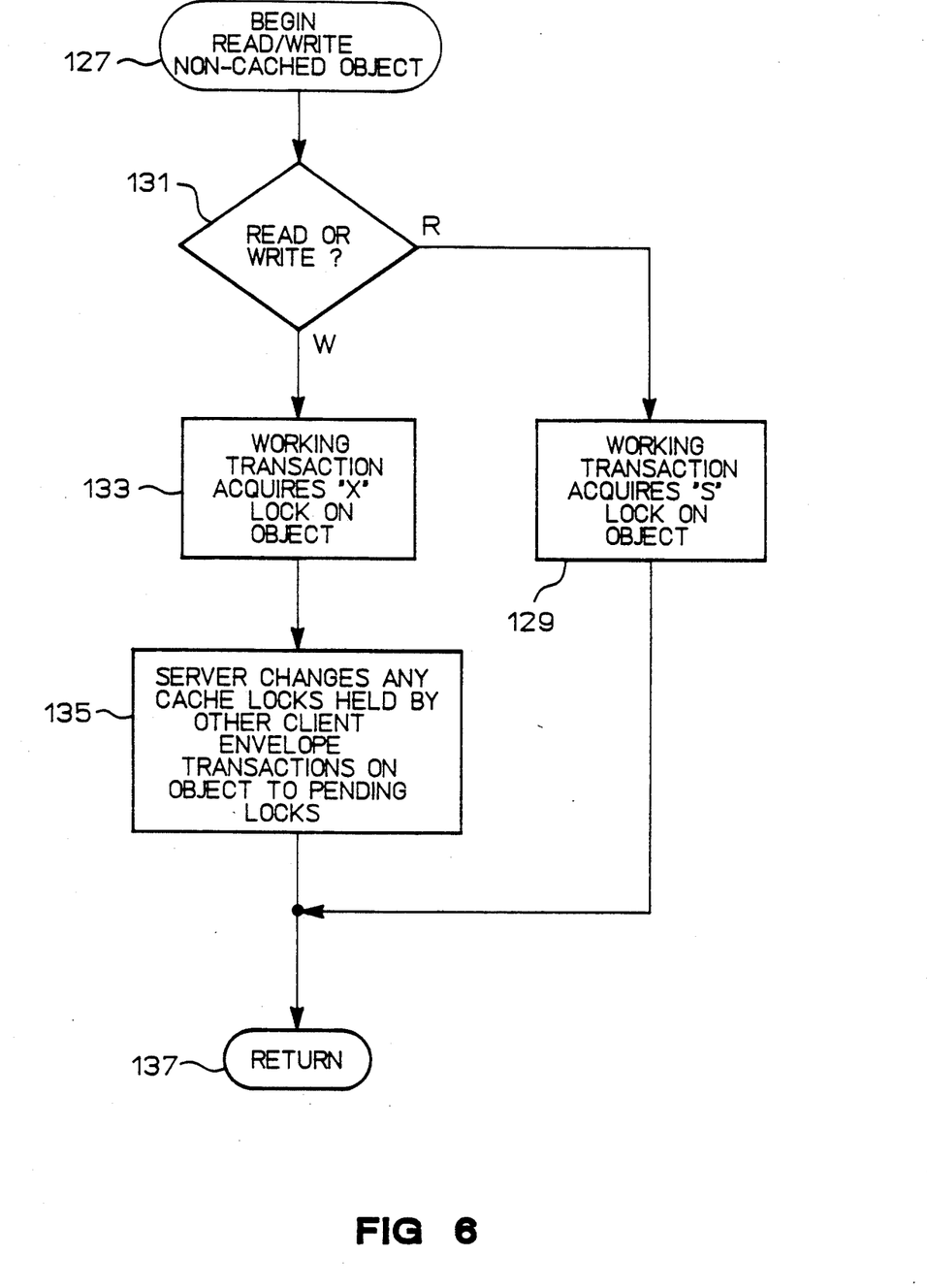
FIG. 6 is a flow chart depicting a typical sequence of steps corresponding with the "read/write non-cached object" box of FIG. 4.

The sequence of reading or writing a non-cached object (block 97) is shown in more detail in FIG. 6. This sequence is used if the working transaction must access an object that has not been placed in the cache and it is not desired to place it there prior to being accessed. The sequence begins (block 127) with the working transaction acquiring from the server an "S" lock (block 129) if the transaction is a read (block 131) or an "X" lock (block 133) if the transaction is a write. If the latter, the server changes any cache locks held by other clients' envelope transactions to pending locks (block 135) and the procedure ends (block 137).

Figure 7A:
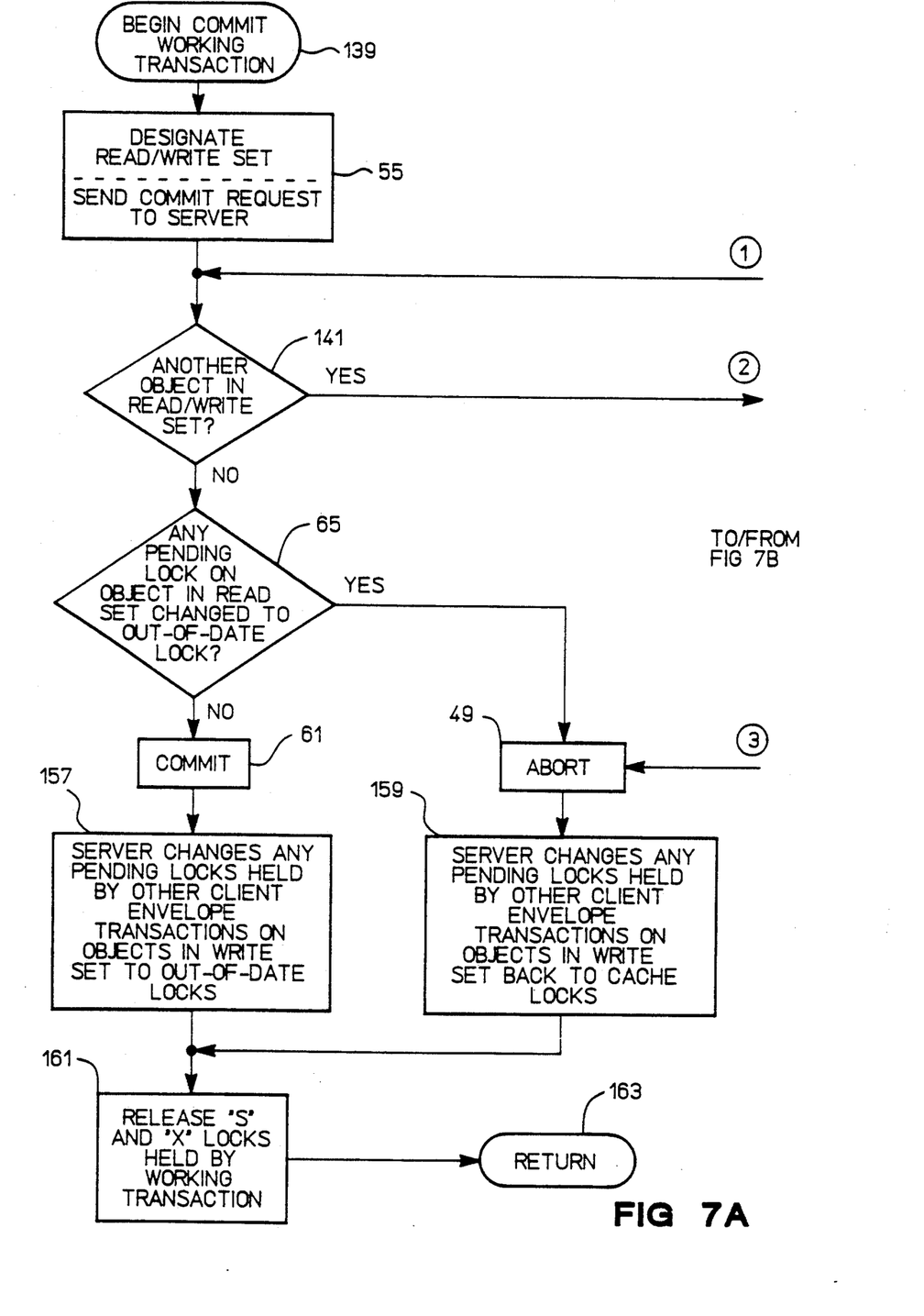
FIG. 7 is a flow chart depicting a typical sequence of steps corresponding with the "commit working transaction" box of FIG. 4.
Figure 7B:
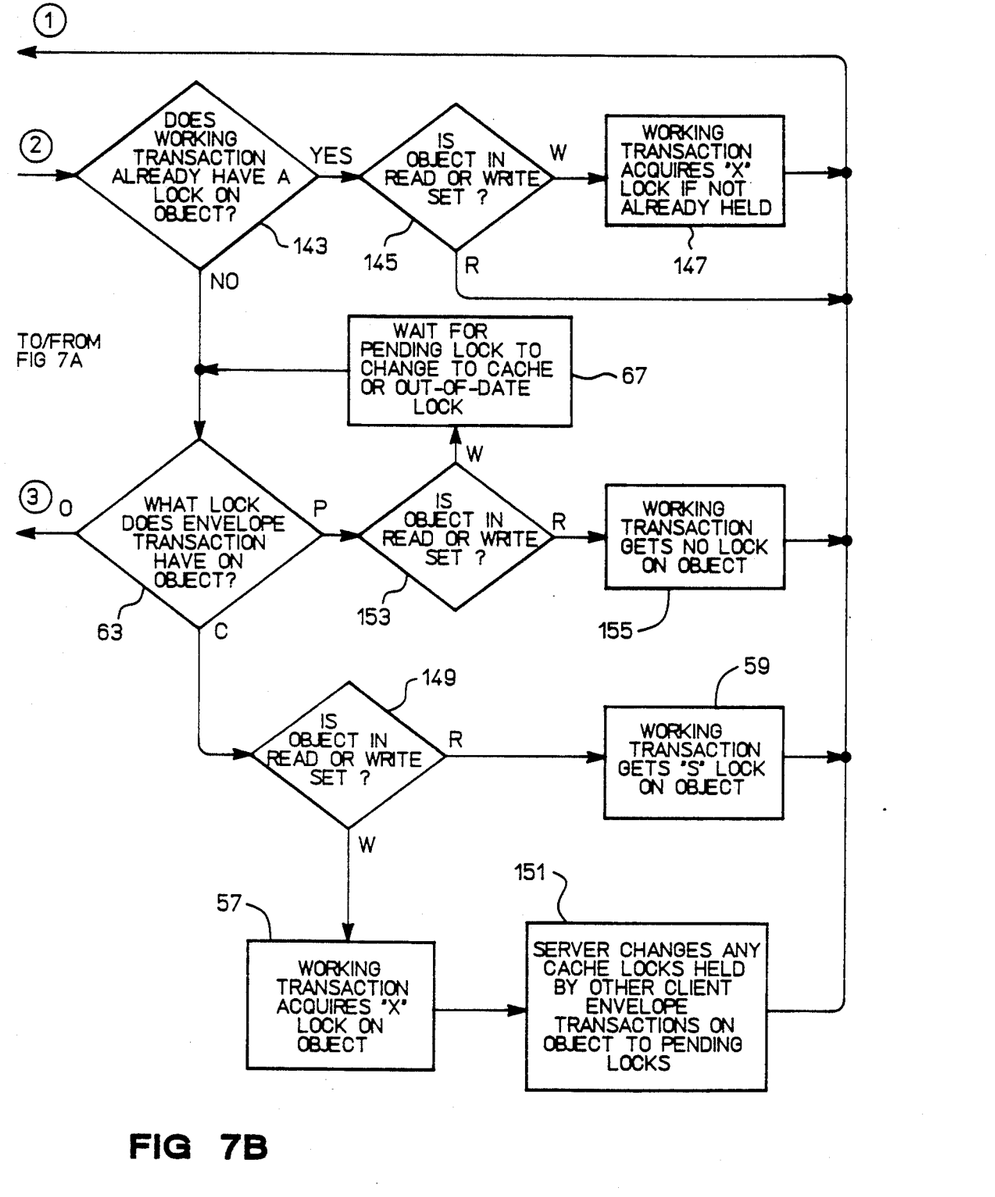

The sequence of committing the working transaction (block 109) is shown in more detail in FIG. 7. The sequence begins (block 139) with designating the read/write set and sending a commit request to the server (block 55). For each object in the read/write set (block 141), if the working transaction already has a lock on the object (block 143) which would usually be the case if the object is not in the cache, the lock is either an "S" lock or an "X" lock. If the object is in the read set no further action is required (block 145), but if the object is in the write set and the lock is not already an "X" lock then one must be acquired (block 147).

The objects in the read/write set could be considered in any arbitrary order, but this could lead to deadlock. Therefore, to reduce the liklihood of deadlocks it is preferred to consider the read objects first, then the write objects.

If the working transaction does not already have a lock on the object, then the object must be in the cache and the envelope transaction has a lock on it. If this lock is a cache lock (block 63) and the object is in the read set (block 149) the working transaction gets an "S" lock (block 59). Note that the fact that the envelope transaction has a cache lock guarantees that no other working transaction has an "X" lock, thereby assuring that the "S" lock will be granted upon request. If the lock is a cache lock and the object is in the write set, the working transaction acquires an "X" lock on the object (block 57) and any cache locks held by other clients' envelope transactions on the object are changed to pending locks (block 151).

If the lock is a pending lock and the object is in the read set (block 153) the working transaction gets no lock on the object (block 155) and a decision on what to do about the pending lock is deferred. As already noted, if the object is in the write set the working transaction waits for the lock to change (block 67). If the lock is an out-of-date lock, the transaction aborts (block 49).

When the locks on all the objects have thusly been determined, there is a further check of the pending locks (block 65) on which decisions were previously deferred to see whether any of them has changed to an out-of-date lock. If none of them has changed, the transaction can commit without violating serializability (block 61) but if any has changed the transaction aborts (block 49).

Any pending locks held by envelope transactions of other clients are changed to out-of-date locks if the transaction committed (block 157) or back to cache locks if the transaction aborted (block 159). Then any "S" and "X" locks held by the working transaction are released (block 161) and the procedure ends (block 163).

As already indicated, any cache lock held by the client's envelope transaction on an object is changed if another client's working transaction acquires an "X" lock on the object, as best shown in FIG. 2. Once a second client's working transaction starts (block 165) and acquires an "X" lock on an object on which the first client's envelope transaction holds a cache lock (block 167), the cache lock is changed by the server to a pending lock (block 51). Nothing further is changed until the second transaction attempts to commit (block 169) at which time the pending lock is changed to an out-of-date lock (block 47) if the commit was successful (block 171), or back to a cache lock (block 53) otherwise, and in either event the second transaction stops (block 173).

The following lock compatibility matrix (Matrix I) shows that any of the three new locks provided by the invention is compatible with either S or X locks held by another transaction, although as discussed above an X lock causes a cache lock to change to a pending lock.

MATRIX I

| LOCK HELD BY 1st CLIENT: | | S | X | C | P | O |
|---|---|---|---|---|---|---|
| LOCK HELD BY 2nd CLIENT: | S | OK | No | OK | OK | OK |
| | X | No | No | OK | OK | OK |

As has been discussed above, in order to reduce message traffic it is optimistically assumed that cached objects are not database "hot spots". The client keeps track of its read/write set until commit time, when the commit request and read/write set are sent to the server. Meanwhile, if a working transaction must access a cached object it uses the cached version, as already noted. When a working transaction acquires an "S" or "X" lock on a cached object at commit time, as described in connection with FIG. 7, it may be considered as having "inherited" either the envelope transactions's cache, pending or out-of-date lock (blocks 57, 59, 63, 67, 149, 153, and 155) or its own already-existing "S" or "X" lock (blocks 143, 145 and 147) and upgrading the inherited lock according to the following lock upgrade matrix (Matrix II):

MATRIX II

| INHERITED LOCK: WORKING TRANS. REQUESTS UPGRADE TO: | S | X | C | P | O |
|---|---|---|---|---|---|
| S | S | S | X | S | P | No |
| X | X | X | X | X | Wait | No |

High conflict rates will result in many aborted working transactions. This can be avoided either by incurring the overhead of notifying clients whenever a cache lock changes to an out-of-date lock, or preferably by appending a list of such changes to some other message that must be sent to the client anyway, as already discussed. The envelope transaction can refresh immediately, particularly if it is desired to optimize response time, although to optimize throughput better results are likely to be obtained if refreshing is deferred until the out-of-date cached object is actually needed.

From the foregoing it will be appreciated that the method of the invention provides a highly efficient method of maintaining the consistency of cached data in a client-server database system. The novel locks and envelope transaction impose very litle system overhead and are easily implemented in the context of a conventional two-lock concurrency control system. By minimizing message traffic between clients and server, the cost of transactions is reduced and throughput improved under many conditions when compared with results that would otherwise be obtained.

Although specific embodiments of the invention have been described and illustrated, the invention is not to be limited to the specific forms or arrangements of parts so described and illustrated, and various modifications and changes can be made without departing from the scope and spirit of the invention. Within the scope of the appended claims, therefore, the invention may be practiced otherwise than as specifically described and illustrated.

We claim:

1. A computer-implemented method of maintaining consistency of cached data in a computerized database system of the kind that includes (a) a server having a lock manager that provides share and exclusive locks, a database memory, and a plurality of objects stored in the database memory and (b) a remotely located cache memory for storing objects for use by a first client application, each object in the cache memory corresponding with an object in the database memory, the method comprising:

acquiring a cache lock on an object in the database memory that is copied into the cache, this step being performed by the lock manager, the cache lock being held by the first client application;

changing the cache lock to an out-of-date lock if the object in the database memory is altered by a second client application, this step being performed by the lock manager, the first client application continuing to access objects in the cache notwithstanding the existence of any out-of-date locks on such objects; and aborting a working transaction of the first client application if said working transaction attempts to commit after having accessed a cached object that corresponds with an object in the database memory on which the lock manager has placed an out-of-date lock.

2. A computer-implemented method according to claim 1 wherein the step of changing the cache lock to an out-of-date lock comprises the following steps performed by the lock manager:

changing the cache lock to pending lock if a working transaction of the second client application acquires an exclusive lock on the object in the database memory; and changing the pending lock to an out-of-date lock if the transaction commits and back to a cache lock if the transaction aborts.

3. A computer-implemented method according to claim 1 wherein the step of acquiring a cache lock comprises acquiring a share lock on an object in the database memory, copying the object into the cache, and changing the share lock to a cache lock.

4. A computer-implemented method of maintaining consistency of cached data in a computerized database system of the kind that includes (a) a server having a lock manager that provides share and exclusive locks, a database memory, and a plurality of objects stored in the database memory and (b) a remotely located cache memory for storing objects for use by a first client application, each object in the cache memory corresponding with an object in the database memory, the method comprising the following steps performed by the lock manager:

acquiring a cache lock on an object in the database memory that has been copied into the cache for use by the first client application, the cache lock being held by the first client application;

changing the cache lock to a pending lock if a working transaction of a second client application acquires an exclusive lock on the object in the database memory; and changing the pending lock to an out-of-date lock if the transaction commits and back to a cache lock if the transaction aborts, the first client application continuing to access objects in the cache prior to committing despite the existence of any pending or out-of-date locks on such objects.

5. A computer-implemented method according to claim 4 and further comprising the following steps performed by a working transaction of the first client application if said working transaction is ready to commit:

designating any cached objects that have been accessed by said working transaction of the first client application as read or write objects;

acquiring, through the lock manager, an exclusive lock on each object in the database memory that has a cache lock and that corresponds with a write object;

acquiring, through the lock manager, a share lock on each object in the database memory that has a cache lock and that corresponds with a readobject; and aborting if an object in the database memory that corresponds with any read or write object has an out-of-date lock.

6. A computer-implemented method according to claim 4 and further comprising the following steps performed by a working transaction of the first client application if said working transaction is ready to commit:
designating any cached objects that have been accessed by said working transaction of the first client application as read or write objects;
waiting for any pending lock on an object in the database memory that corresponds with a write object to change to a cache lock or to an out-of-date lock;
acquiring, through the lock manager, an exclusive lock on each object in the database memory that has a cache lock and that corresponds with a write object;
acquiring, through the lock manager, a share lock on each object in the database memory that has a cache lock and that corresponds with a read object; and
aborting if an object in the database memory that corresponds with any read or write object has an out-of-date lock.

7. A computer-implemented method according to claim 4 and further comprising the step, performed by the server, of including in a message from the server to the first client application a report indicating which cache locks on objects in the database memory that have been copied into the cache memory of the first client application have been changed to out-of-date locks.

8. A computer-implemented method according to claim 4 wherein the step of acquiring a cache lock comprises acquiring a share lock on an object in the database memory, copying the object into the cache, and changing the share lock to a cache lock.

9. A computer-implemented method of maintaining consistency of cached data in a computerized database system of the kind that includes (a) a server having a lock manager that provides share and exclusive locks, a database memory, and a plurality of objects stored in the database memory and (b) a remotely located cache memory for storing objects for use by a client application, each object in the cache memory corresponding with an object in the database memory, the method comprising the following steps performed by the client application:
commencing an envelope transaction, the envelope transaction being operative to acquire, through the lock manager, a cache lock on any object in the database memory that is copied into the cache for use by the client application; and
continuing the envelope transaction until after a plurality of working transactions of the client application have committed and until the client application no longer requires a cache.

10. A computer-implemented method according to claim 9 and further comprising the following steps performed by the lock manager:
changing any cache lock held by the envelope transaction to a pending lock if a working transaction of a second client application acquires an exclusive lock on said object; and
changing the pending lock to an out-of-date lock if said working transaction of the second client application commits and back to a cache lock if said transaction aborts.

11. A computer-implemented method according to claim 9 wherein the step of acquiring a cache lock comprises acquiring a share lock on an object in the database memory, copying the object into the cache, and changing the share lock to a cache lock.

12. A computer-implemented method of maintaining consistency of cached data in a computerized database system of the kind that includes (a) a server having a lock manager that provides share and exclusive locks, a database memory, and a plurality of objects stored in the database memory and (b) a remotely located cache memory for storing objects for use by a first client application, each object in the cache memory corresponding with an object in the database memory, the method comprising:
(a) the following step performed by the first client application: acquiring, through the lock manager, a cache lock on an object in the database memory that has been copied into the cache for use by the first client application;
(b) the following steps performed by the lock manager if a working transaction of a second client application acquires an exclusive lock on an object on which the first application holds a cache lock:
  (1) changing the cache lock to a pending lock;
  (2) if said working transaction of the second client application commits, changing the pending lock to an out-of-date lock; and
  (3) if said transaction aborts, changing the pending lock back to a cache lock; and
(c) the following steps performed by a working transaction of the first client application upon requesting a commit:
  (1) designating as read or write objects any cached objects that said working transaction of the first client application has accessed;
  (2) waiting for any pending lock on an object in the database memory that corresponds with a write object to change to a cache lock or to an out-of-date lock;
  (3) acquiring, through the lock manager, an exclusive lock on each object in the database memory that has a cache lock and that corresponds with a write object;
  (4) acquiring, through the lock manager, a share lock on each object in the database memory that has a cache lock and that corresponds with a read object;
  (5) aborting if an object in the database memory that corresponds with any read or write object has an out-of-date lock; and
  (6) releasing the share and exclusive locks after committing or aborting.

13. A computer-implemented method according to claim 12 wherein step (c)(3) further comprises, for each object on which the working transaction of the first client application adquires an exclusive lock and on which another client application has a cache lock, the following steps performed by the lock manager:
(a) changing the cache lock held by the other client application to a pending lock of said other client application,
(b) if the working transaction of the first client application commits, changing the pending lock of said other client application to an out-of-date lock, and (c) if the working transaction of the first client application aborts, changing the pending lock of said other client application back to a cache lock.

14. A computer-implemented method according to claim 12 and further comprising, prior to step (a), commencing an envelope transaction for the first client application and wherein step (a), acquiring a cache lock, is performed by said envelope transaction.

15. A computer-implemented method according to claim 14 wherein the envelope transaction continues until after a plurality of working transactions of the first client application have committed and until the first client application no longer requires a cache.

16. A computer-implemented method according to claim 12 and further comprising the step, performed by the server, of including in a message from the server to the first client application a report indicating which cache locks on objects in the database memory that have been copied into the cache memory of the first client application have been changed to out-of-date locks.

17. A computer-implemented method according to claim 12 wherein the step of acquiring a cache lock comprises acquiring a share lock on an object in the database memory, copying the object into the cache, and changing the share lock to a cache lock.

* * * * *